Jan. 13, 1931.  J. G. SCHUDEL  1,788,959
PROCESS FOR THE MANUFACTURE OF PHOSPHORUS
OXYCHLORIDE AND THIONYL-CHLORIDE
Original Filed Nov. 18, 1926
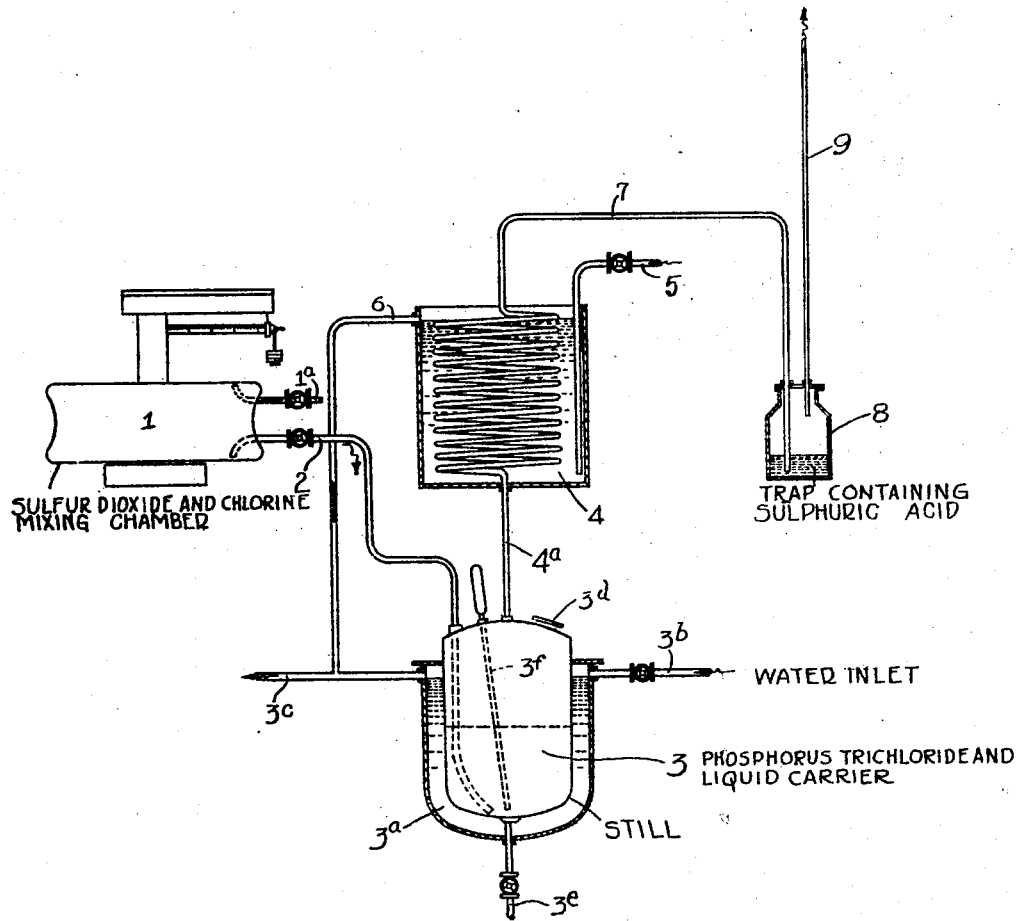
JOHN GEORGE SCHUDEL  INVENTOR
BY  R. L. Sibley.
ATTORNEY Patented Jan. 13, 1931

1,788,959

UNITED STATES PATENT OFFICE

JOHN GEORGE SCHUDEL, OF NITRO, WEST VIRGINIA, ASSIGNOR TO THE ELKO CHEMICAL COMPANY, OF NITRO, WEST VIRGINIA, A CORPORATION OF WEST VIRGINIA

PROCESS FOR THE MANUFACTURE OF PHOSPHORUS OXYCHLORIDE AND THIONYL CHLORIDE

Continuation in part of application Serial No. 149,063, filed Nov. 18, 1926. This application filed June 13, 1928. Serial No. 285,140.

My invention relates particularly to a process of making phosphorus oxychloride and thionyl chloride, and has relation especially to the manufacture thereof with the aid of chlorine and sulphur dioxide.

Both phosphorus oxychloride and thionyl chloride are becoming of increased importance as the demand for and use of the same is steadily increasing. For example, phosphorus oxychloride is being used extensively as a condensing agent in a large number of chemical reactions and the esters of the same with phenols, cresols, etc., are used widely as plasticizers and camphor substitutes.

Many methods have been suggested for the manufacture of phosphorus oxychloride, as for example, the oxidation of phosphorus trichloride with potassium chlorate (Jour. f. pr. Chemie, 1883, (2) Vol. 23, p. 382); the reaction between pentachloride and water (G. Oddo, G. 25, II, p. 330); by passing chlorine over heated calcium metaphosphate and coal (German Patent 138,392); the reaction of phosgene upon calcium phosphate (U. S. Patent 1,424,193); by passing sulphur dioxide gas over phosphorus pentachloride (Annalen 102; 111, 1857); the reaction of sulphuryl chloride with phosphorus trichloride (German Patent 415,312). Also, it has been proposed to make thionyl chloride by the action of sulphur dioxide gas on phosphorus pentachloride (Schiff, Annalen, 102, page 111, 1857), which however, gives only 50% of the theoretical quantity (Vanino, Praep. Chemie, I, p. 94); or the action of sulphuryl chloride on phosphorus trichloride (German Patent 415,312); the interaction of sulphur trioxide, sulphur chloride and chlorine (German Patent 139,455); the reaction between sulphuryl chloride and carbon monoxide, or phosgene and sulphur dioxide (German Patent 284,935).

All of these previous processes for producing these two compounds are, however, complicated and expensive. For example, phosphorus pentachloride is expensive and its interaction with sulphur dioxide is slow and produces, furthermore, a poor yield. The products obtained from phosphorus trichloride and sulphuryl chloride are difficult to separate in view of the boiling points, the boiling point of sulphuryl chloride being 68—69° C., phosphorus trichloride 74° C., thionyl chloride 78—79° C., and phosphorus oxychloride 107° C.

I have found that when chlorine and sulfur dioxide are mixed together, as hereinafter referred to in carrying out the desired reaction, and used simultaneously either as a mixture of gases or as liquefied gases that this mixture reacts with phosphorus trichloride according to the following reaction:

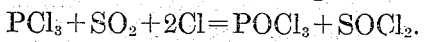

$$PCl_3 + SO_2 + 2Cl = POCl_3 + SOCl_2.$$

This reaction is instantaneous and quantitative.

In carrying out the present invention, it has been found that the phosphorus trichloride could be present in any desired excess when using sulfur dioxide and chlorine in the proper ratio, the only products obtained being phosphorus oxychloride and thionyl chloride. The rate of the reaction is controlled by the amount of external cooling applied, and the reaction may be carried out in an open container unless it is conducted at a temperature above the boiling point of thionyl chloride, in which case a reflux condenser may be attached, or the thionyl chloride may be distilled off as formed.

My prior application upon liquefied gases and process of using the same, executed on the 29th day of September, 1926, is related generically to the present invention, and is Serial No. 140,427, filed October 8, 1926.

While my invention is capable of embodiment in many different forms, I have described only certain forms of the same in detail herein, and while it is capable of being carried out in many different types of apparatus, I have shown only one type of apparatus for use in connection therewith in the drawing, in which—

The figure is a diagrammatic representation of an apparatus which may be used in accordance with my invention in the instance where a reflux condenser is to be used. It will be understood, however, that if desired, the reflux condenser may be omitted, as above pointed out.

For example, in carrying out my invention I may introduce liquid sulfur dioxide into a sulfur dioxide and chlorine mixing chamber 1 by means of a pipe 1a, and thereafter I may introduce liquid chlorine into the same. An outlet pipe 2 is provided from the vessel 1, which discharges into a phosphorus trichloride and liquid carrier 3 below the surface of the liquid therein. The phosphorus trichloride and liquid carrier 3 may have a cooling jacket 3a provided with a current of cooling water by means of inlet and outlet pipes 3b and 3c. Said phosphorus trichloride and liquid carrier 3 also has a charging hole 3d and a valved drain pipe 3e, as well as a thermometer 3f. If desired, the liquid sulfur dioxide and chlorine may be allowed to expand prior to entering the phosphorus trichloride and liquid carrier 3 before the reaction, but preferably the mixed liquids which form a solution are introduced directly into the contents of the phosphorus trichloride and liquid carrier 3 in order to utilize the cooling effect of the same. As a result, a lively reaction ensues which is controlled by adjusting the amount of mixed liquid gases fed into the same and the amount of external cooling applied. The end of the reaction may be observed by one or more of the following conditions: A distinct fall in temperature and/or by cessation of the complete absorption of the mixed gases or liquids. In case the above reaction is conducted at a temperature above the boiling point of thionyl chloride, the phosphorus trichloride and liquid carrier 3 will have provided thereon a reflux condenser 4 connected to the phosphorus trichloride and liquid carrier 3 by a pipe 4a, the condenser being cooled by a current of water provided by inlet and outlet pipes 5 and 6, respectively, which latter is connected to the outlet pipe 3c, leading from the phosphorus trichloride and liquid carrier jacket. From the reflux condenser 4 an outlet pipe 7 passes into a trap 8 containing sulfuric acid and having a vent pipe 9. After the reaction product has thus been obtained, the components of the reaction mixture may be separated by fractional distillation in an efficient column.

It will be understood that many changes may be made in the proportion of the materials above used, as well as the order in which they are introduced, and the temperatures under which the reactions are conducted, etc. The preferred method of practicing the invention, however, comprises the reaction between substantially equimolecular proportions of phosphorus trichloride, sulfur dioxide and chlorine as indicated in the equation hereinbefore stated.

This case is a continuation in part of application Serial No. 149,063, filed November 18, 1926, by the present applicant which was issued as Patent No. 1,753,754, dated April 8, 1930.

What is claimed is:

1. The process which comprises producing phosphorus oxychloride and thionyl chloride by the reaction of a mixture of sulfur dioxide and chlorine on phosphorus trichloride.

2. The process which comprises producing phosphorus oxychloride and thionyl chloride by the reaction of a mixture of sulfur dioxide and chlorine on phosphorus trichloride, the sulfur dioxide and chlorine being in the form of a liquid.

3. The process which comprises producing phosphorus oxychloride and thionyl chloride by the reaction between substantially equimolecular proportions of sulfur dioxide, chlorine and phosphorus trichloride.

4. The process which comprises producing phosphorus oxychloride and thionyl chloride by the reaction between substantially equimolecular proportions of sulfur dioxide, chlorine and phosphorus trichloride, said reacting constituents being in the liquid phase.

In testimony whereof I hereunto affix my signature.

JOHN GEORGE SCHUDEL.